Patented Nov. 13, 1928.

1,691,841

UNITED STATES PATENT OFFICE.

RENÉ DALOZE, OF UCCLE, BRUSSELS, BELGIUM.

PROCESS FOR PRODUCING PURE LEAD CARBONATE FROM CRUDE LEAD SULPHATE.

No Drawing. Application filed October 18, 1926, Serial No. 142,527, and in France July 3, 1926.

This invention relates to a process for producing pure lead carbonate from crude sulphate of lead or from residues, such as slimes derived from lead chambers, and containing sulphate of lead.

The invention turns to account a double-decomposition reaction between lead sulphate and an alkali-earth metal acetate the bases of which form insoluble sulphates such as calcium acetate and barium acetate, and renders such reaction a practical proposition by using an excess of alkali-earth metal acetate which, in the solution produced, prevents the reaction from being reversed. This solution contains, in addition to the excess of alkali-earth metal acetate, the lead acetate formed in the said solution, and is treated with a base (preferably alkali-earth metal oxide or alkali-earth metal hydroxide corresponding to the alkali-earth metal acetate used) to form tri-basic lead acetate in solution which is decomposed with carbon dioxide to precipitate lead carbonate.

The process can in particular be effected in such fashion that after the separation of the insoluble matter and/or the insoluble alkali earth metal sulphate, the addition of the bases and the precipitation of the lead carbonate by the carbon dioxide determines the regeneration of the initial solution employed for the treatment of the crude or impure sulphate of lead employed as the initial material.

According to one method of carrying out the invention, a mixed solution is used which contains three equivalent parts of calcium acetate for one equivalent part of lead acetate. This mixed solution is caused to act upon crude lead sulphate (for example preliminarily neutralized slime from lead chambers) in the proportion of two equivalent parts of lead sulphate contained in the initial material to three equivalent parts of calcium acetate contained in the mixed solution. The double-decomposition reaction is shown in the following equation:

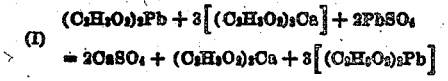

The insoluble matter comprising calcium sulphate formed in the course of reaction is separated with the aid of known means from the solution containing the lead acetate; the excess (one equivalent part in the present example) of calcium acetate prevents the reaction from being reversed. The stable solution is treated with milk of lime in the proportion of two equivalent parts of calcium oxide or calcium hydroxide to three equivalent parts of lead acetate in solution. Two equivalent parts of lead are thus precipitated, (i. e. two-thirds of the lead in solution) in the form of lead hydroxide which is, as soon as it is formed, instantly re-dissolved into tri-basic lead acetate by combining with the third portion of lead which has remained in solution in the form of neutral acetate, so that the reaction is as follows:

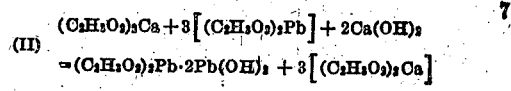

Lead in this reaction is converted into tri-basic lead acetate while the three molecules of calcium acetate of the initial solution are simultaneously recovered.

The liquid is filtered to eliminate any possible slight excess of lime or of other insoluble compounds whereafter the clear solution is treated by a stream of carbon dioxide to produce the final reaction:

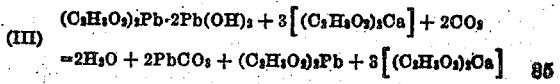

Lead carbonate is precipitated in this reaction and the molecule of lead acetate of the initial solution is recovered. The lead carbonate thus formed is separated by filtration and the resulting regenerated mixed solution of lead acetate and calcium acetate can be used again for dissolving crude lead sulphate.

Should crude lead sulphate to be treated also contain iron as an impurity, the latter may be dissolved in reaction (I) with the aid of the solution of calcium acetate or of the mixed solution of lead acetate and calcium acetate. In this case, precipitation caused by lime or an alkali-earth metal hydroxide leads to precipitation of dissolved iron in the form of insoluble tri-basic iron acetate which is separated in the filtering operation preceding the precipitation (III) of lead carbonate. The loss in acetate entailed by this possibly necessary precipitation of iron may always be compensated for by suitable additions of soluble acetates made before the regenerated mixed solution is used again.

Having thus described my invention, what I claim and desire to secure by Letters Patent is—

1. A process for the manufacture of pure lead carbonate, comprising the steps of treating crude lead sulphate (for example, slime from lead chambers) with a solution of alkali-earth metal acetate the bases of which form insoluble sulphates such as calcium acetate, barium acetate, etc., in excess to effect a double decomposition between the lead sulphate and said alkali-earth metal acetate, separating the resulting solution from the insoluble matter (comprising insoluble alkali-earth metal sulphate derived from the said double decomposition), treating the separated solution with an alkali-earth metal base; and decomposing by carbon dioxide the tri-basic lead acetate formed in solution, to precipitate lead carbonate.

2. A process for the manufacture of pure lead carbonate, comprising the steps of treating crude lead sulphate with a solution containing lead acetate the bases of which form insoluble sulphates such as calcium acetate, barium acetate, etc., and alkali-earth metal acetate to effect a double decomposition between the lead sulphate and said alkali-earth metal acetate, separating the resulting solution from the insoluble matter (comprising insoluble alkali-earth metal sulphate derived from said double decomposition), treating the separated solution with an alkali-earth metal base; decomposing by carbon dioxide the tri-basic lead acetate formed in solution thereby precipitating lead carbonate; and regenerating the initial solution containing lead acetate and alkaline-earth acetate and separating the lead carbonate from the regenerated solution.

3. In a process according to claim 2, using a mixed solution containing three equivalent parts of calcium acetate $[(C_2H_3O_2)_2Ca]$ for one equivalent part of lead acetate $[(C_2H_3O_2)_2Pb]$, in the proportion of two equivalent parts of lead sulphate contained in the crude lead sulphate material treated; treating the resulting solution separated from the insoluble matter with two equivalent parts of calcium hydroxide $[Ca(OH)_2]$; decomposing by carbon dioxide one equivalent part of tri-basic lead acetate $[(C_2H_3O_2)_2Pb.2Pb(OH)_2]$ formed in solution thereby precipitating lead carbonate; and reforming the said initial mixed solution and separating the lead carbonate from the regenerated solution.

In testimony whereof I affix my signature.

RENÉ DALOZE.